Nov. 22, 1966   J. E. CANDLIN, JR., ET AL   3,287,038
FIFTH WHEEL PLATE FOR RAILROAD CAR FIFTH WHEEL STANDS
Original Filed May 4, 1960                3 Sheets-Sheet 1
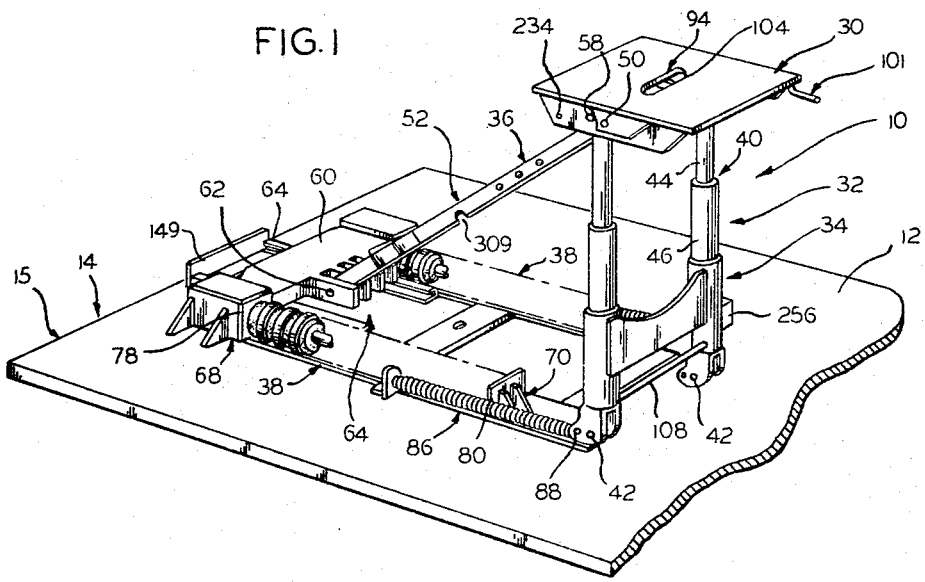
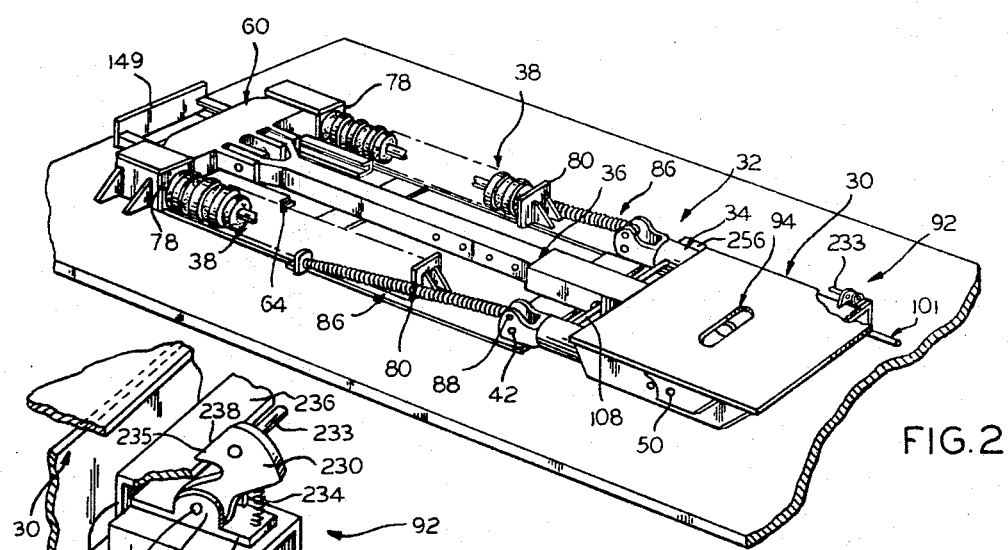
INVENTORS
JAMES E. CANDLIN JR.
BY WILLIAM VAN DER SLUYS
Mann, Brown + McWilliams
ATTORNEYS

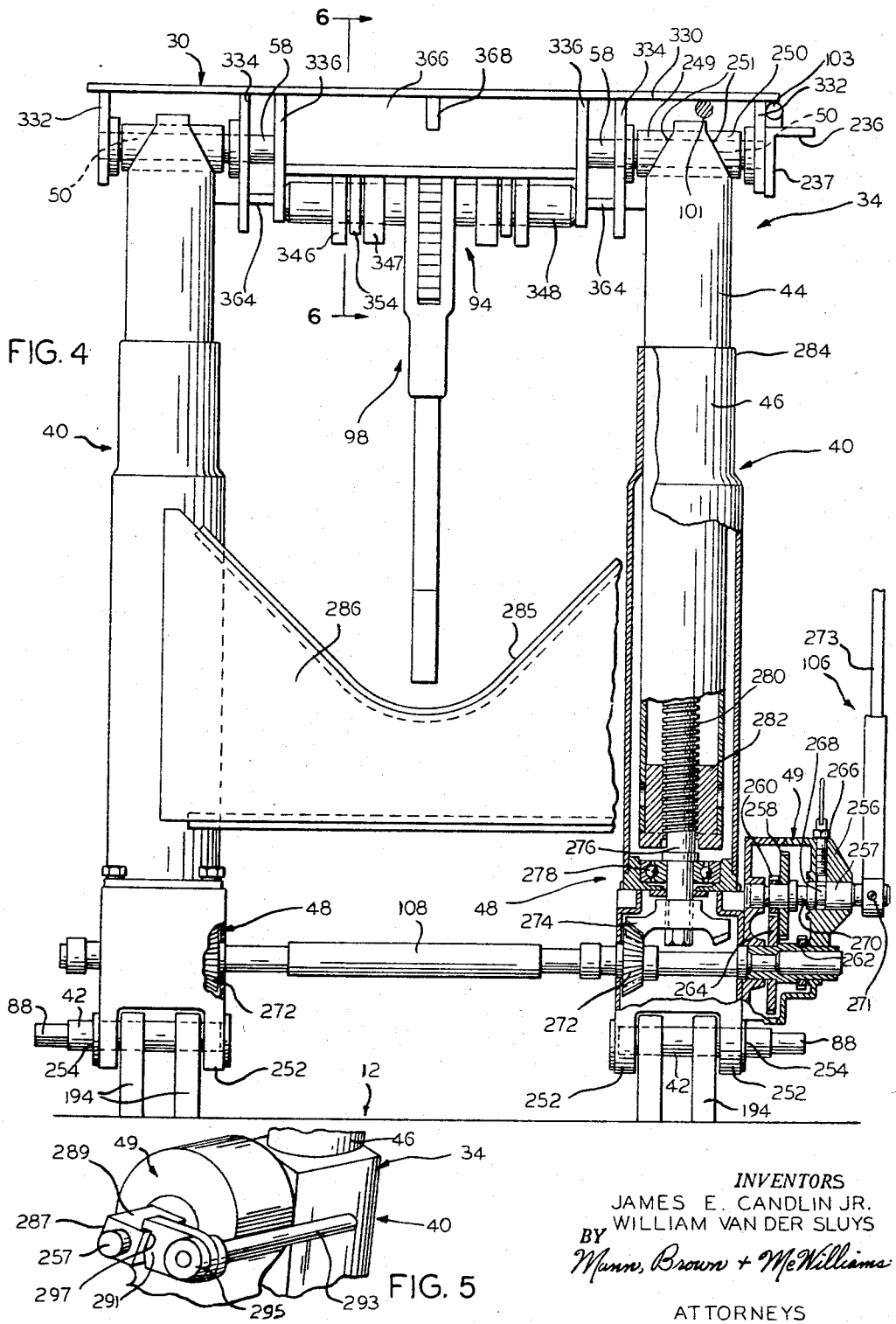

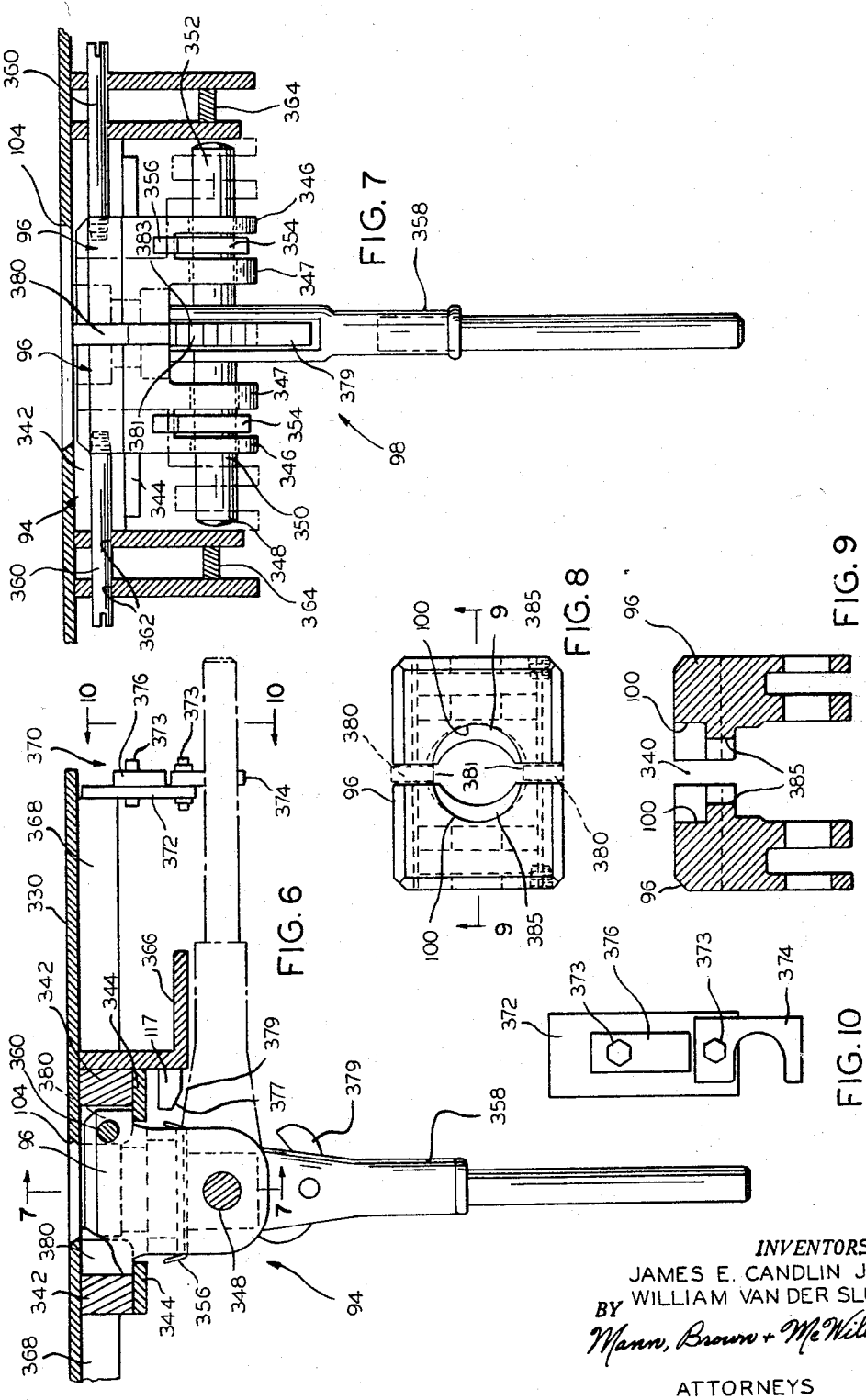

United States Patent Office 3,287,038
Patented Nov. 22, 1966

3,287,038
FIFTH WHEEL PLATE FOR RAILROAD CAR FIFTH WHEEL STANDS
James E. Candlin, Jr., Lansing, and William Van Der Sluys, Homewood, Ill., assignors to Pullman Incorporated, Chicago, Ill., a corporation of Delaware
Original application May 4, 1960, Ser. No. 26,884, now Patent No. 3,183,854, dated May 18, 1965. Divided and this application Oct. 8, 1963, Ser. No. 317,864
4 Claims. (Cl. 287—20.5)

This application is a division of our application Serial No. 26,884, filed May 4, 1960, now Patent No. 3,183,854, granted May 18, 1965.

This invention relates to a fifth wheel plate for railroad car fifth wheel stands, and more particularly, to a fifth wheel plate device for use in the piggyback system of freight handling, for the purpose of latching the trailer to the car.

As is well known in the art, the piggyback system of freight handling contemplates the transportation of freight in trailers which are carried on a railroad flatcar a major portion of the distance between shipping points and destinations. The trailers may be positioned on the car by any one of a number of standard methods involving either the use of the trailer tractor or other prime mover, or a crane for bodily lifting the trailer onto the car.

Trailers are customarily secured to the car by what is known as a fifth wheel stand, which uniformly includes a latching device for grasping the kingpin of the trailer, with the stands being supplemented in most instances by suitable tie down devices associated with the trailer chassis.

One of the foremost difficulties in this art is the very practical problem of having to spot the trailer with respect to the fifth wheel stand so that the kingpin latch device of the stand may be actuated to serve its intended function. Trailers customarily include a load that may be on the order of 60,000 pounds, which makes it very difficult to shift the trailer after it has been positioned on the car and left standing on its landing gear. This means that the trailer must either be very carefully spotted or that the fifth wheel stand must be arranged to permit a reasonable tolerance in the trailer positioning.

Most conventional forms of fifth wheel stands involve a support or structure for the kingpin latching device which is operable to move the latching device from an inoperative retracted or lowered position on the floor of the car to an operative elevated position in which the latch device engages the trailer kingpin, and of course, trailers must be spotted on the car so that the trailer kingpin is within the operative range of the latch device. Heretofore, improvements in this art have been directed toward increasing the spotting tolerance permitted by the stand and relying on the stand, at least to some extent, to effect such lateral and longitudinally contrary of the kingpin as may be required.

Furthermore, the usual approach to the problem has been that the fifth wheel stand should have a fixed path of movement between its inoperative and operative positions, leaving it to those who load the trailer on the car to do so accurately enough that the kingpin and the trailer will be properly engaged and centered, if need be, by elevating the fifth wheel stand. Moreover, the operative elevated position of conventional stands customarily is at a fixed distance above the car deck, which does not take into consideration that trailer heights vary considerably; whice some stands permit some variation in trailer height, the spotting tolerance of the stand is adversely affected.

We have determined that as a matter of practice, the actual spotting tolerance employed can be relatively small as tractor operators have no great difficulty in spotting trailers within an inch or two of any desired location. Therefore, in contrast to previous approaches, our invention involves arranging the stand so that it may be adjusted as required to obtain the desired seating action with respect to the trailer kingpin without having to bodily move the trailer.

Consequently, a principal object of this invention is to provide a fifth wheel stand for railroad cars that not only permits adjustment of the position of the kingpin latching device to accommodate a reasonable trailer spotting tolerance, but also provides optional fifth wheel height and contemplates that spotting tolerance will be independent of the height of the trailer.

Other objects of the invention are to provide an improved fifth wheel plate arrangement that is inexpensive of manufacture, convenient in use even by inexperienced personnel, and adapted for use in connection with all standard railroad car and trailer equipment customarily employed in piggyback service.

Other objects, uses and advantages will be obvious or become apparent from a consideration of the following detailed description and the application drawings.

In the drawings:

FIGURE 1 is a diagrammatic perspective view illustrating one embodiment of the fifth wheel stand of our Patent No. 3,183,854 as it would be applied to a conventional railroad flatcar, illustrating the same in its operative position in which it is adapted for connection to the kingpin of a conventional trailer that is to be mounted for transit on the railroad car;

FIGURE 2 is similar to FIGURE 1, but illustrating the fifth wheel stand in its lowered inoperative position when it is latched against the floor of the car;

FIGURE 3 is a fragmental diagrammatic perspective view of a latch device that is employed to hold the fifth wheel stand of FIGURES 1 and 2 in its lowered inoperative position;

FIGURE 4 is a front elevational view of the vertical strut arrangement employed in the stand of FIGURES 1–3, showing same applied to the fifth wheel plate structure, parts being broken away to facilitate illustration;

FIGURE 5 is a fragmental perspective view showing the jack actuating gear box of FIGURE 4 as adapted to receive a conventional power operated wrench, together with a latching arrangement thereof for holding the vertical struts against retraction during rail transit;

FIGURE 6 is a fragmental sectional view approximately along line 6—6 of FIGURE 4, parts being shown in elevation;

FIGURE 7 is a diagrammatic fragmental sectional view along line 7—7 of FIGURE 6, parts being shown in elevation;

FIGURE 8 is a plan view of the kingpin latching jaws employed in the fifth wheel stand of this invention;

FIGURE 9 is a sectional view along line 9—9 of FIGURE 8; and

FIGURE 10 is an elevational view along line 10—10 of FIGURE 6.

General description

Reference numeral 10 of FIGURES 1 and 2 generally indicates one embodiment of our invention secured to the supporting surface or bed 12 of a standard railroad flatcar 14 (which may take any suitable form, and which is illustrated only diagrammatically), the stand 10 being applied to what may be termed the front end 15 of the car. As is well known in the art, the purpose of fifth wheel stands, such as stand 10, is to secure the front end of trailer to the car by connection to the trailer kingpin, and for purposes of this description the car end shown may be considered the front end, though it is obvious that the stand of this invention may be applied to any point on the car desired.

The stand 10 comprises a fifth wheel plate structure 30 (see FIGURE 1) that embodies the invention of this application carried by a lift structure 32 composed of a vertical supporting strut structure 34 and a diagonal prop strut structure 36, and cushioning devices 38 (shown in block diagram form in FIGURES 1 and 2) that are coupled to the lower end of the diagonal strut structure 36.

The vertical strut structure 34 comprises a pair of spaced vertical struts 40 pivoted by pins 42 to the bed of car 12 and composed of telescoping members 44 and 46, which in accordance with the present invention are moved between extended and retracted positions by jack devices 48, indicated generally in FIGURE 4, that are operated through suitable gearing 49 selectively providing relatively high and relatively low gear ratios for high and low speed lifting and lowering of fifth wheel plate structure. The vertical struts are pivotally secured to the fifth wheel plate structure by trunnion forming pins or stub shafts 50.

The diagonal strut structure 36 consists of a telescoping diagonal strut 52 composed of telescoping members 54 and 56; member 56 is pivoted to fifth wheel plate structure 30 by appropriate trunnion forming pins 58 while member 54 is pivoted to a slider member 60, by appropriate pins 62, which latter member 60 is mounted in trackway 64 for movement toward and away from the vertical struts 40. Slider member 60 is keyed to the respective cushioning devices 38, the details of which are fully disclosed in our said Patent No. 3,183,854.

As is further indicated in FIGURES 1 and 2, tension spring devices 86 are connected between pins 88 that are affixed to the vertical struts 40 eccentrically of pins 42, and abutment plates 90 affixed to the bed of the car. In accordance with the invention of our said patent, the spring devices 86 are arranged so that they will pull the fifth wheel stand from its lowermost horizontal inoperative position to a partially raised inclined position from which it may be manually brought to a substantially vertical position by the exercise of minimum effort. The fifth wheel stand is held in its lowered position by the latch arrangement generally indicated at 92 in FIGURES 2 and 3.

The fifth wheel plate structure 30 is provided with a kingpin latching device 94 (see FIGURES 6–10) including jaws 96 mounted under the kingpin receiving opening 104 of the fifth wheel plate structures for movement toward and away from each other by ratchet assembly 98 (see FIGURES 6–9). Jaws 96 are formed as at 100 (see FIGURE 10) to define the kingpin seat of the stand.

The specification of our said Patent No. 3,183,854 may be referred to for a complete description of said stand (all reference numerals used in the drawings of said patent being retained in the drawings of the instant application for easy reference to corresponding structures).

*Specific description of fifth wheel plate*

The fifth wheel plate structure 30 comprises plate member 330 (see FIGURE 4) having affixed thereto spaced vertical plates 332, 334, and 336. The pins 50 that secure the vertical struts 40 to the fifth wheel plate structure are secured between flanges 332 and 334 in any convenient manner while pins 58 that are employed to secure the diagonal strut to the fifth wheel plate structure are applied between flanges 334 and 336 in any suitable manner.

Referring to FIGURES 6–10, the plate member 330 of the fifth wheel plate structure is formed to define intermediate of the forward and rearward ends thereof the kingpin opening 104, which in accordance with this invention is a closed perimeter opening extending laterally of plate member 330 so that the fifth wheel plate structure resists thrusts in either direction with equal facility. Opening 104 is elongate in configuration (compare FIGURES 6 and 7) and extends laterally of plate member 330 and transversely of the car 14; fixed underneath opening 104 are guide elements 342 carrying track members 344 extending laterally of the plate member 330 on which the kingpin latch device jaws 96 are slidably mounted for movement laterally of the plate member and transversely of the car 14. Jaws 96 are each provided with pierced lugs 346 and 347 through which extends shaft 348, the ends 350 and 352 of which are formed with right and left hand threads, respectively, on which are threaded nuts 354 that are received between the respective lugs 346 and 347. Appropriate springs 356 bias the nuts against shaft 348 sufficiently to insure their movement only on operation of ratchet assembly 98.

Operatively associated with shaft 348 in a conventional manner is ratchet device 358 of any conventional type, which together with shaft 348 forms ratchet assembly 98. The jaws 96 each have secured thereto guide pins 360 which ride in perforations 362 of plates 334 and 336 to guide the movement of the respective kingpin latching jaws.

The fifth wheel plate structure may be reinforced by appropriate stiffener bars 364 (see FIGURE 4) and 368, as well as angle member 366 applied between plates 336. Associated with the rearward stiffener 368 is a lock device 370 for holding ratchet assembly 98 in the inoperative broken line position of FIGURE 6. Device 370 comprises a depending plate 372 affixed to the end of the indicated stiffener 368 and plate 372 has pivotally secured thereto as by bolts 373 a hooked shaped latching arm 374 and an eccentrically pivoted pawl 376. When pawl 376 is in the position of FIGURE 10, arm 374 cannot be swung from its indicated position and thus will provide support for ratchet device 358. When pawl 376 is swung in either direction away from its position of FIGURE 10, pawl 374 may be pivoted to release or receive ratchet device 358.

Lug 117 for locking the operating mechanism of ratchet device 358 in the position of FIGURE 6 is affixed to angle member 366 in the plane of movement of ratchet device 358 and is provided with a cam surface 377 adapted to engage the ratchet pawl 379 and pivot the latter into engagement with the teeth 381 of the conventional ratchet wheel 383 that forms a part of ratchet device 358. The arrangement is such that ratchet pawl 379 when engaged by lug 117 holds shaft 348 against rotation in the direction that would open jaws 96.

When the ratchet assembly 98 is actuated, after the fifth wheel stand has been placed in the position of FIGURE 8 of our said patent, the jaws 96 are drawn together about the kingpin and the seat portions 100 (formed to complement the shape of standard kingpins) thereof effectively lock the kingpin within the fifth wheel plate structure. It will be noted that jaws 96 each include a projection 385 that are received within king slot 387 (see FIGURE 13a of our said patent) when the jaws are in locking engagement with the kingpin.

In the form illustrated, forward and rearward spacers or abutment members 380 are affixed to the undersurface of plate member 330 adjacent the middle portion of opening 104 on either side of the opening which limit the permissible movement of the jaws towards each other, as seat portions 100 are struck on radii complementary to the corresponding radii of the standard kingpin. These spacers are indicated in FIGURES 6–8 and their principal purposes are to take the thrusts applied to the fifth wheel plate structures through the kingpin (or vice versa) and to guide the king pin in its movement out of kingpin opening 104. The spacers 380 thus prevent the kingpin groove portion from catching on the plate 330 when the stand is to be released from the trailer (note the kingpin centering action of these elements indicated in FIGURES 6 and 8). Spacers 380 are preferably hardened to avoid broaching, when the kingpin leaves kingpin opening 104, in the event the stand is lowered from the trailer without removing diagonal strut pin 112.

The truss point 340 described in connection with FIGURE 13a of our said patent is applied to FIGURE 9 to indicate its desired positioning with regard to jaws 96.

*Distinguishing characteristics of the invention*

It will therefore be seen that we have provided a fifth wheel stand for railroad cars having a number of important characteristics.

As the fifth wheel plate structure of the stand is formed with a closed perimeter kingpin opening, it is necessarily closed on all sides and thus capable of withstanding thrust pressures applied against it in either direction when longitudinal impacts are occasioned. This is to be contrasted with conventional fifth wheel stands, which ordinarily have one end bifurcated to permit the stand kingpin latching device to be brought into engagement with the kingpin by being moved longitudinally of the trailer body as the kingpin latch device is elevated into engagement with the trailer.

The pivotal connections of the vertical and diagonal struts with the fifth wheel plate structure insure that the forces applied to the kingpin will be largely in shear and without the tensioning effect so characteristic of conventional stands. The problem of undue tension stresses being applied to the kingpin is eliminated by practicing this aspect of our invention.

As the ends of the diagonal strut are secured to the fifth wheel plate structure and the car bed, respectively, there is no need for lifting of heavy prop members to secure the vertical strut in its desired upright position; this may be done by merely applying a pin to appropriately align holes in the telescoping diagonal strut members.

The fifth wheel stand impact cushioning arrangements disclosed in this application form the subject matter of our divisional application Serial No. 506,451, filed November 3, 1965.

The foregoing description and the drawings are given merely to explain and illustrate our invention and the invention is not to be limited thereto, except insofar as the appended claims are so limited, since those skilled in the art who have our disclosure before them will be able to make modifications and variations therein without departing from the scope of the invention.

We claim:

1. A fifth wheel plate structure for a railroad car fifth wheel stand comprising a plate member defining forward and rearward ends with said plate member being formed with an elongate closed perimeter opening adjacent its median portion, said opening extending laterally of said plate member, a pair of jaws mounted in said opening for movement toward and away from each other and laterally of said plate member, said jaws being formed with diametrically opposed kingpin seat portions, means for moving said jaws toward and away from each other, and spaced abutment members carried by said plate structure and disposed between said jaws in opposed relation at the forward and rearward sides of said opening, said abutment members being spaced from each other a distance to receive between them a trailer kingpin and defining opposed wear surfaces against which the kingpin is adapted to bear when a trailer kingpin is received in said opening and said jaws have been applied to the kingpin.

2. The plate structure set forth in claim 1 wherein said means for moving said jaws comprises ratchet means, and including means for selectively rendering said ratchet means inoperable when said jaws have been applied to a trailer kingpin.

3. The plate structure set forth in claim 1 wherein said means for moving said jaws comprises ratchet means comprising an elongate handle member secured to said plate member in depending relation beneath same and a ratchet mechanism means operatively secured between said handle member and said jaws for actuating said jaws, and lock means for securing said handle member in an inoperative substantially horizontally disposed position.

4. The plate structure set forth in claim 3 wherein said lock means comprises a depending member pivotally secured to said plate member in the plane of movement of said handle member and spaced from said ratchet mechanism means, said depending member having a hooked shaped lower end and being mounted for pivotal movement to one side of said handle member plane of movement, said hooked shaped lower end being proportioned to receive and hold said handle member against movement from a substantially horizontal position, and means for releasably securing said depending member against said pivotal movement when said handle member is received in said hooked shaped lower end.

References Cited by the Examiner

UNITED STATES PATENTS

| | | | |
|---|---|---|---|
| 910,237 | 1/1909 | Miller | 269—61 |
| 2,815,224 | 12/1957 | Waters | 280—433 |
| 2,862,265 | 9/1958 | Van Dinen | 279—66 |
| 2,903,267 | 9/1959 | Nelson | 279—66 |
| 2,936,983 | 5/1960 | Markenstein et al. | 280—433 |
| 2,977,137 | 3/1961 | Durham | 280—434 |

CLAUDE A. LE ROY, *Primary Examiner.*

CARL W. TOMLIN, *Examiner.*

I. B. TALTON, R. P. SEITTER, *Assistant Examiners.*

UNITED STATES PATENT OFFICE
CERTIFICATE OF CORRECTION

Patent No. 3,287,038                          November 22, 1966

James E. Candlin, Jr., et al.

It is hereby certified that error appears in the above numbered patent requiring correction and that the said Letters Patent should read as corrected below.

Column 2, line 44, for "thereof" read -- therefor --; column 6, line 43, for "910,237" read -- 910,937 --; line 45, for "2,862,265" read -- 2,852,265 --.

Signed and sealed this 12th day of September 1967.

(SEAL)
Attest:

ERNEST W. SWIDER                        EDWARD J. BRENNER
Attesting Officer                            Commissioner of Patents